United States Patent
Held

[19]

[11] Patent Number: 6,099,934
[45] Date of Patent: Aug. 8, 2000

[54] COVER FOR A COMPUTER MOUSE

[76] Inventor: Jerry M. Held, P.O. Box 1342, Monterey, Calif. 93940

[21] Appl. No.: 09/316,460

[22] Filed: May 21, 1999

[51] Int. Cl.[7] .................................................. B32B 3/06
[52] U.S. Cl. ............................ 428/100; 428/99; 200/333; 150/165
[58] Field of Search ..................... 428/99, 100; 200/333; 150/165; D14/114

[56] References Cited

U.S. PATENT DOCUMENTS

| D. 291,203 | 8/1987 | Silver | D14/114 |
| D. 381,015 | 7/1997 | Morrison et al. | D14/114 |
| D. 386,164 | 11/1997 | Silberstein | D14/114 |
| 5,245,146 | 9/1993 | Florence | 200/333 |
| 5,851,623 | 12/1998 | Tarulli et al. | 428/68 |

*Primary Examiner*—Alexander Thomas
*Attorney, Agent, or Firm*—Theodore J. Bielen, Jr.

[57] ABSTRACT

A cover for a computer mouse utilizing a sheath having a first portion extending over the side portion of the mouse. A flap connects to the sheath and includes a notch which aligns with portions of the switch actuators on the mouse to permit access to the same. A fastener is also employed to anchor the sheath and connected flap to the cord of the mouse. The flap provides a surface for presentation of indicia or for attachment of three-dimensional objects. Such three-dimensional objects may be attached directly to the upper surface of the computer mouse.

7 Claims, 2 Drawing Sheets

COVER FOR A COMPUTER MOUSE

BACKGROUND OF THE INVENTION

The present invention relates to a novel cover for a computer mouse.

A computer mouse is a well known implement used in conjunction with personal computers. In general, the mouse is cradled by the hand of the user, and moved on a surface to change the position of a cursor on a screen or monitor. Consequently, the mouse includes actuators on an upper surface, a signal cord to its side surface, and a friction ball extending from the bottom surface.

Since mouses are used extensively with computers, they often are subject to contamination by dirt and residue found in the vicinity of a personal computer desk. In addition, skin oils and grim found on the hands of the user are often transferred to the mouse giving them an undesirable appearance. Moreover, the computer mouse is considered to be an aesthetically bleak object, lacking in distinctiveness at a computer table or desk.

U. S. Design Pat. Nos. 291,203, 381,015, and 386,164 show covers for computer mouses in the form of housings which completely cover the mouse and produce a desired aesthetic effect thereby.

U. S. Pat. No. 5,851,623 shows a protective cover for a computer mouse which permits the mouse to operate separate buttons are placed in the protective cover to control the actual button on the computer mouse.

U.S. Pat. No. 5,245,146 shows a computer mouse cover in the form of a miniature automobile which includes pivotal levers to contact the buttons on the mouse within the cover itself.

A computer mouse cover which permits the user to operate the mouse without separate levers or buttons and is held firmly to the mouse would be a notable advance in the computer field.

SUMMARY OF THE INVENTION

The present invention relates to a novel and useful cover for a computer mouse.

A computer mouse generally possesses a bottom, an upper surface, and a side surface. The upper surface provides a hand resting portion and a switch actuator portion. A signal cord is fed into the computer mouse through the side portion, which distends from the upper surface of the computer mouse.

The cover of the present invention utilizes a sheath extending over the side portion of the mouse. The cover may also include a bottom which extends over a portion of the bottom of the mouse leaving an opening for the friction ball, which generally protrudes, somewhat loosely from the bottom of the computer mouse. The sheath may be formed to extend only over a portion of the side portion of the mouse, leaving the side portion in the vicinity of signal cord free from the same.

A flap connects to the sheath of the cover of the present invention and overlies the upper surface of the mouse. The sheath is formed with a notch aligned with the position of the switch actuator or actuators found on the top surface of the computer mouse. Thus, access to the switch actuators is permitted without removal of the cover of the present invention.

The flap may also provide a surface which is presented to the user of the cover of the present invention. Indicia may be placed on the surface of the flap accessible for the purpose of design or for instruction to the user.

Further, a three-dimensional object may be affixed to the flap of the cover of the present invention for the purpose of aesthetics. In addition, the three-dimensional item may be connected directly to the upper surface of the computer mouse without the intervening flap of the cover of the present invention.

Fastening means is also found in the present invention for anchoring the sheath and connective flap of the cover of the present invention to the computer mouse. Fastening means includes a first band connected to the sheath and extends over the signal cord of the computer mouse. A second band is also utilized. The second band possesses a first end portion and a second end portion. The second band is connected to the first band at its first end portion and removably connected to the first band at its second end portion. The second band also extends across the cord of the computer mouse such that interconnection between the first and second bands provides a holding action to the computer signal cord. Thus, the cover is firmly fastened to the computer mouse in this manner. First and second bands may also be elastomeric members to provide flexibility in fit with respect to the computer mouse. The achievement of the removable connection between the second portion of the second band to the first band may take place through a snap connector, a hook and pile fastener, and like fasteners, known in the art.

It may be apparent that a novel and useful cover for a computer mouse has been hereinabove described.

It is therefore an object of the present invention to provide a cover for a computer mouse which is movably attached to the computer mouse and permits the user to operate the computer mouse without removal of the cover.

Another object of the present invention is to provide a cover for a computer mouse which includes a flap portion extending over the upper surface of the computer mouse which is capable of presenting indicia to the user.

A further object of the present invention is to provide a cover for a computer mouse which is capable of supporting a three dimensional object or is capable of being used in conjunction with a three dimensional object positioned at the upper surface of the computer mouse.

Another object of the present invention is to provide a cover for a computer mouse which protects the computer mouse from damage or from soiling.

A further object of the present invention is to provide a cover for a computer mouse which is easily emplaced and removed, allowing the cover to be interchanged with similar covers or to be cleaned simply and easily.

The invention possesses other objects and advantages especially as concerns particular characteristics and features thereof which will become apparent as the specification continues.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figures 1, 2:
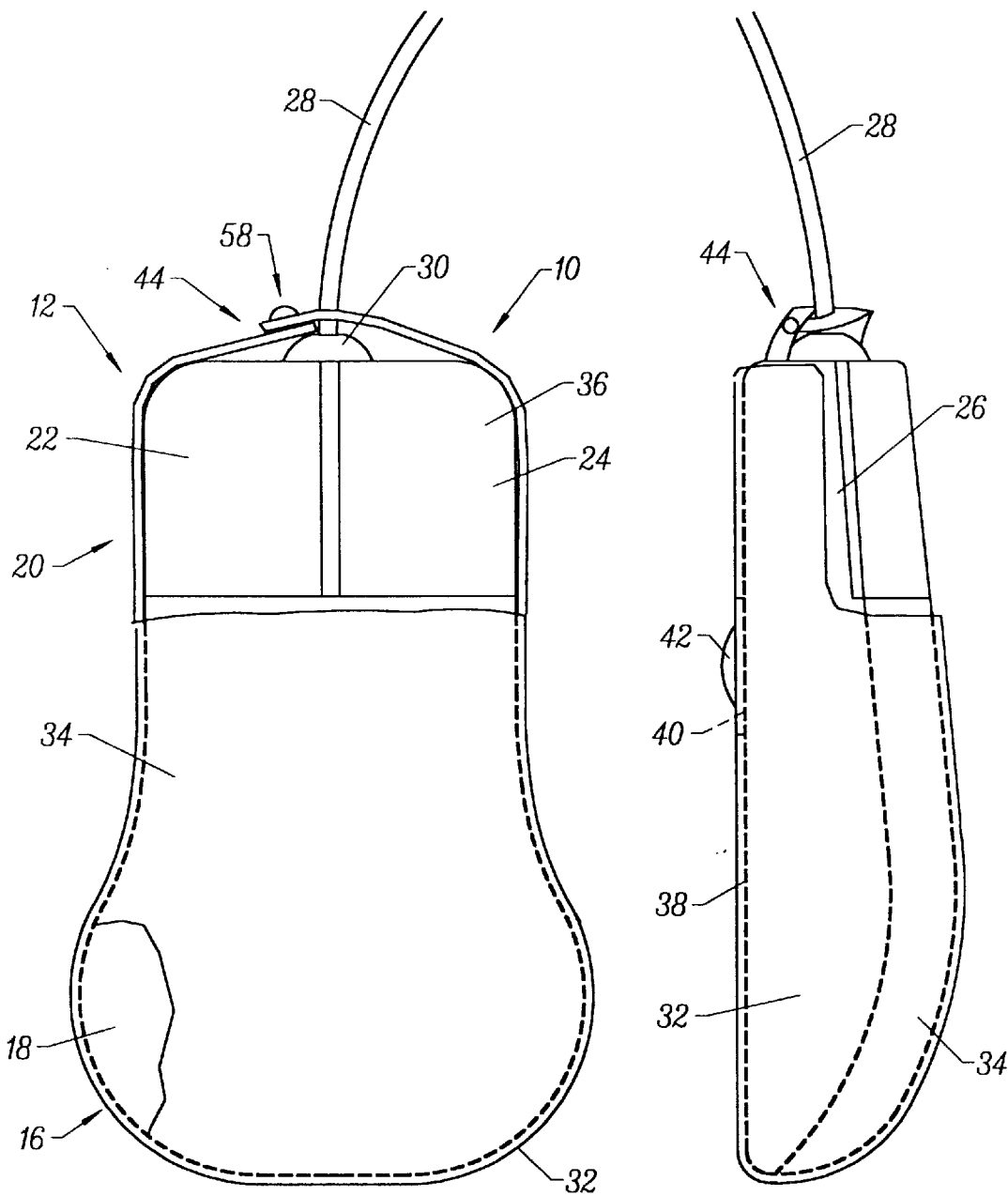
FIG. 1 is a top plan view of the cover of the present invention in place on a computer mouse.
FIG. 2 is a side elevational view of the cover of the present invention in place on a computer mouse.

Reference character 10 is intended to show the cover of the present invention in the drawings FIGS. 1–4. Cover 10 is intended to be employed in conjunction with a computer mouse 12. Computer mouse 12 is of conventional configuration. Including a bottom 14, FIG. 3, and an upper surface 16, FIG. 1 (broken-away portion). Upper surface 16 includes a hand rest portion 18 and a switch actuator portion 20 switch actuator portion 20 is shown in FIGS. 1 and 2 as including buttons or switches 22 and 24. Mouse 12 also is constructed with a distending side portion 26 between upper surface 16 and bottom 14. A signal cord 28 extends into mouse 12 through stop 30. External cord 28 permits electrical signals to be transmitted from mouse 12 to a computer (not shown).

Figure 3:
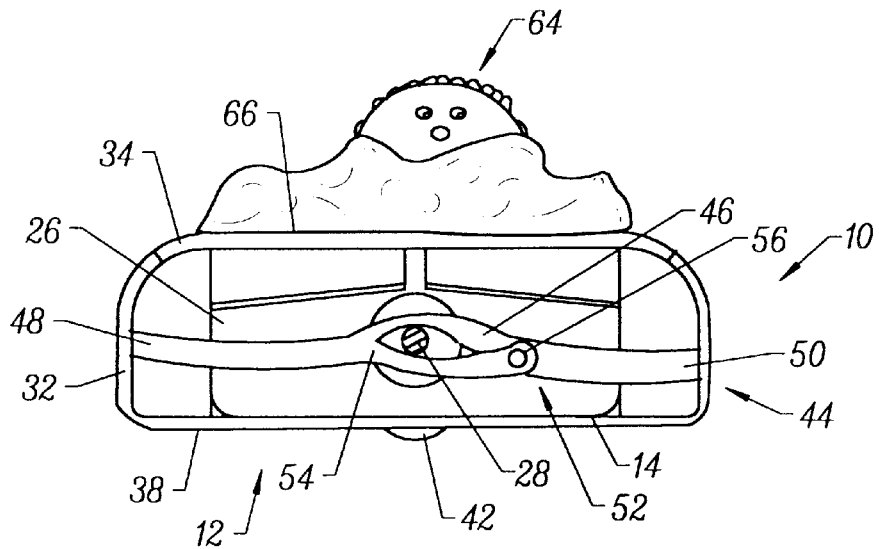
FIG. 3 is a rear elevational view of the cover of the computer mouse, depicting a three-dimensional object affixed to the top surface of the computer mouse.

Cover 10 includes as one of its elements a sheath 32 which extends over side portion 26 of mouse 12. Sheath 32 may be constructed of any supple material such as cotton, nylon, plastic-like materials, and the like. With reference to FIG. 3, it may be observed that sheath 32 does not overlie an area of side portion 26 of mouse 12 in the vicinity of signal cord 28.

Figure 4:
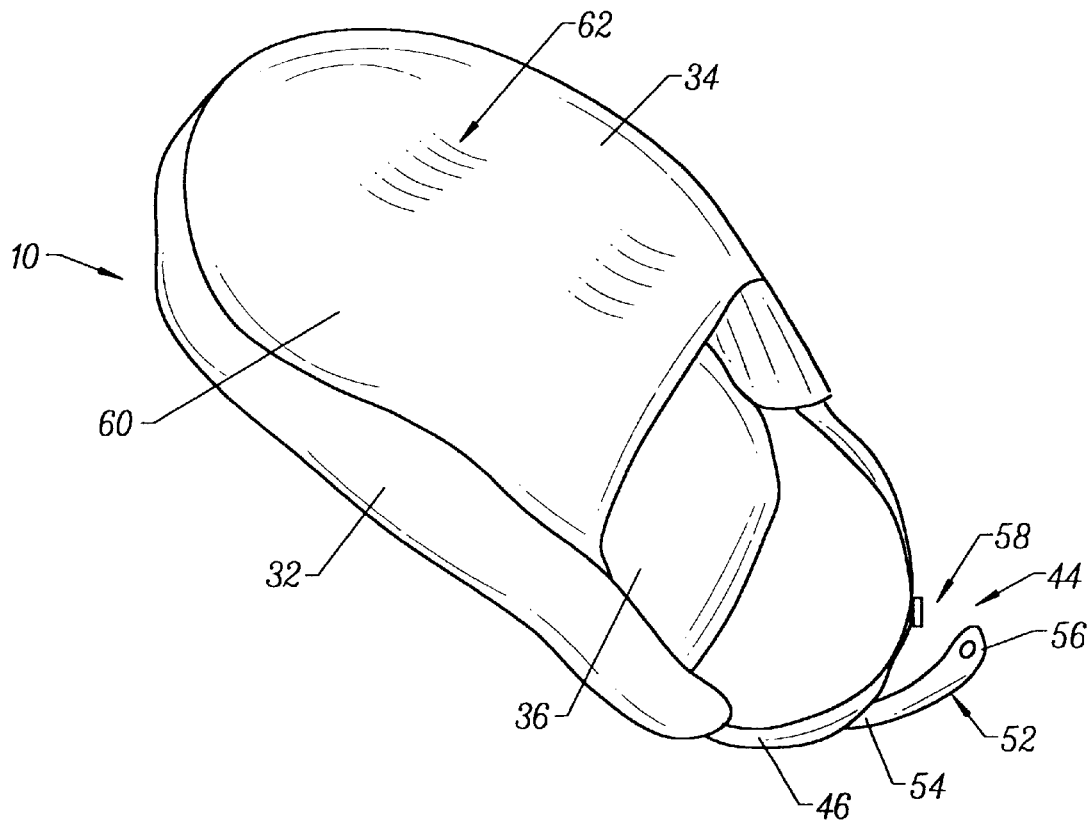
FIG. 4 is a perspective view of a computer mouse cover of the present invention with indicia shown schematically on the upper surface of the flap section of the cover of the present invention.

Cover 10 also includes as one of its elements a flap 34 connected to sheath 32. Flap 34 overlies upper surface 16 of mouse 12. Notch 36, FIG. 4, provides an opening in flap 34 to permit the user to operate switch actuator 20. That is to say, notch 36 is aligned with switches or buttons 22 and 24.

Cover 10 also includes a bottom portion 38 which an opening 40 to allow friction ball 42 to roll on a surface, in a known manner.

Cover 44 also includes fastening means 44 for anchoring sheath 32 and connected flap 34 to mouse 12, specifically signal cord 28. With reference to FIG. 3, in which fastening means 44 is best shown, fastening means 44 includes a first band 46. First band 46 connects to sheath 32 at anchor points 48 and 50. Such connection may be achieved by sewing, gluing, riveting, and the like. Band 46 connects over the top of signal cord 28 as viewed in FIG. 3. Second band 52 includes a first end portion 54 and a second end portion 56. First end portion 54 is connected to first band 46. In the embodiment depicted in FIG. 3, first end portion of second band 52 is formed contiguously with first band 46. Second end portion 56 of second band 52 is removably connected to first band 46. Snap connector 58, FIG. 4 permits such removable connection between second band 52 and first band 46. It should be realized, that other types of connectors may be employed in this regard such as hook and pile fasteners, button and button hole fasteners, mating fasteners, and the like. Second band 52 underlies signal cord 28.

In operation, the user slips sheath 32 over computer mouse 12 such that side portion 26 of mouse 12 is covered to a large degree. Flap 34 extends over the upper surface 16 of computer mouse 12 leaving notch 36 aligned with switch actuators 20. Fastening means 44 is then activated such that bands 46 and 52 extend around signal cord 28 of mouse 12. Bands 46 and 52 may be elastomeric in construction. Flap 34 provides a surface 60 which permits the imprinting or application of indicia 62 which may be of a design nature or of an instructional nature. Three-dimensional object 64, shown in the form of a figurine, may be applied to surface 60 by the use of mastic layer 66, FIG. 3. It should be noted that mastic layer 66 may be also employed to fix three-dimensional object 64 directly to surface 16 of mouse 12 without intermediary flap 34. That is to say, notch 36 may be enlarged to extend over a greater area of upper surface 16 of mouse 12 to permit the fixation or application of object 64. Alternatively, object 64, may be attached to mouse 12 upper surface 16 without the use of cover 10.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A cover for a computer mouse possessing a bottom, an upper surface having a surface with hand-rest portion and a switch actuator portion a distending side portion between the upper surface and the bottom, and a cord located at the side portion, comprising:

a. a sheath having a portion extending over the side portion of the mouse;

b. a flap connected to said sheath, said flap overlying the upper surface of the mouse, said sheath including a notch aligned with the position of the switch actuator to permit access to the switch actuator; and c. fastening means for anchoring said sheath and connected flap to the cord, said fastening means including a first band connected to said sheath and extending across the cord of the computer mouse and a second band, having a first end portion and a second end portion, said second band connected to said first band at said first end portion of said second band, and removably connected to said first band at said second end portion of said second band.

2. The cover of claim 1 in which said second band second end portion and said first band include fastening means for removably connecting said second band to said first band.

3. The cover of claim 2 in which said fastening means comprises a snap connector.

4. The cover of claim 2 in which said fastening means comprises a hook and pile fastener.

5. The cover of claim 1 in which said flap further comprises a first surface lying against the upper surface of the computer mouse and a second visible surface, said second surface of said flap including indicia thereupon.

6. The cover of claim 1 in which said flap further comprises a first surface lying against the upper surface of the computer mouse, said first surface of said flap including a mastic layer to hold said flap to the upper surface of the computer mouse, said flap further comprising a second opposite surface, and an object, said object possessing a mastic layer for holding the object to the second opposite surface of said flap.

7. The cover of claim 1 in which said first and second bands are elastomeric members.

* * * * *